Figure 3:
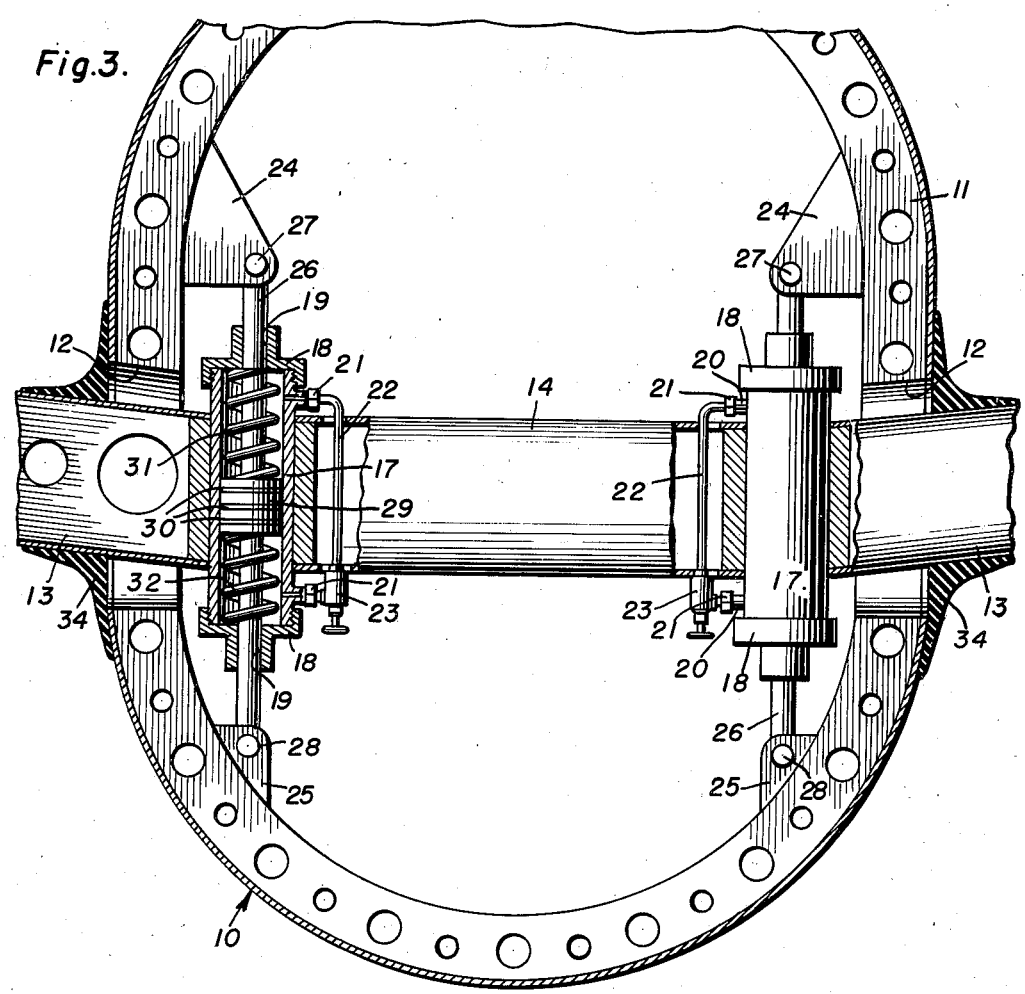

Feb. 15, 1949.　　　A. H. LEONARD ET AL　　　2,461,747
AIRCRAFT WING MOUNTING
Filed May 26, 1947　　　　　　　　　　　　　　2 Sheets-Sheet 1
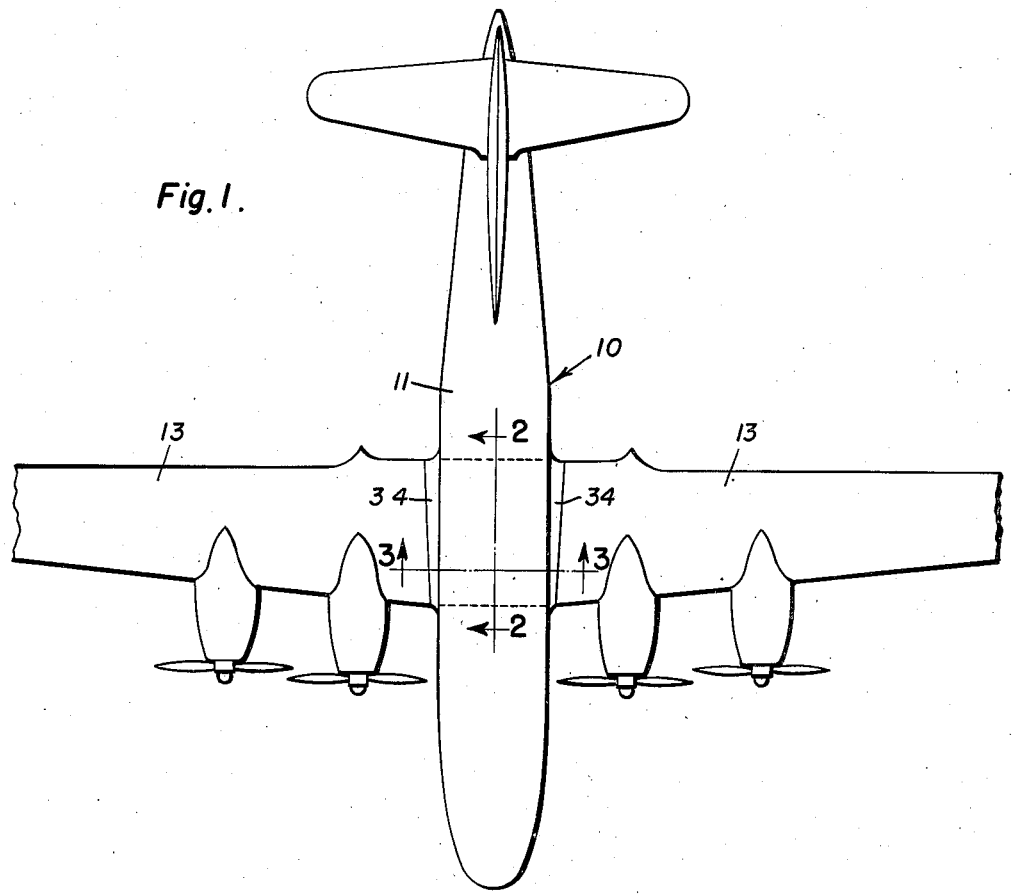
Fig.1.
Fig.2.
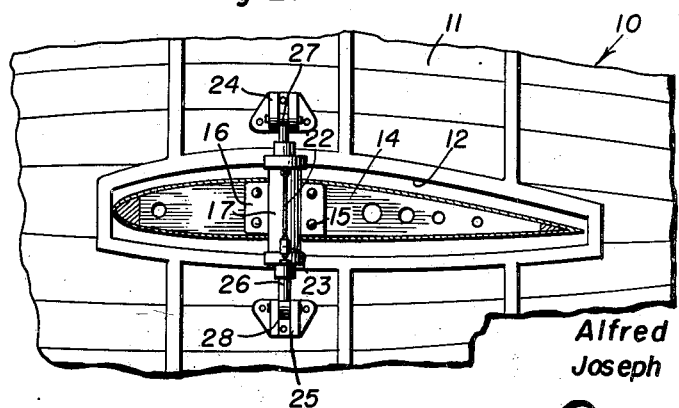
Inventor
Alfred H. Leonard
Joseph H. Blandford
By Clarence A. O'Brien
and Harvey B. Jacobson
Attorneys Feb. 15, 1949.  A. H. LEONARD ET AL  2,461,747
AIRCRAFT WING MOUNTING Filed May 26, 1947  2 Sheets—Sheet 2

Inventor
Alfred H. Leonard
Joseph H. Blandford

By Clarence A. O'Brien
and Harvey B. Jacobson
Attorneys

Patented Feb. 15, 1949

2,461,747

UNITED STATES PATENT OFFICE 2,461,747

AIRCRAFT WING MOUNTING

Alfred H. Leonard, San Diego, Calif., and Joseph H. Blandford, Twin Falls, Idaho Application May 26, 1947, Serial No. 750,546

4 Claims. (Cl. 244—38)

This invention relates to an aircraft wing mounting and has for its primary object to prevent shocks encountered by the wings of an airplane when traversing rough air from being transferred to the fuselage of the plane.

Another object is to improve the comfort of the passengers and occupants of the plane both during the take-off and the landing of the plane.

Among its features, this invention embodies a fuselage, laterally extending wings for the fuselage, and means yieldingly to couple the wings to the fuselage for movement parallel with the vertical axis of the fuselage.

Other features include a wing spar mounted in the fuselage for movement parallel with the vertical axis of the fuselage, a wing carried by each end of the wing spar and extending laterally from the fuselage, yielding means adjacent each end of the wing spar for coupling the latter to an adjacent side of the fuselage, and means to retard the action of the yielding means.

Still other features include means to control the retarding effect of the retarding means.

Figure 4:
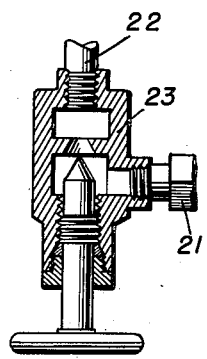

In the drawings,

Figure 1 is a top plan view of an airplane embodying the features of this invention, certain portions being broken away, Figure 2 is a longitudinal sectional view taken substantially along the line 2—2 of Figure 1 and on a somewhat enlarged scale, Figure 3 is a greatly enlarged transverse sectional view taken substantially alone the line 3—3 of Figure 1, and Figure 4 is an enlarged sectional view through a valve suitable for regulating the flow of the hydraulic fluid used as the retarder.

Referring to the drawings in detail an airplane designated generally 10 is equipped with a conventional fuselage 11 having in opposite sides near the point where the wings are normally coupled to the fuselage enlarged openings 12 (Figs. 2 and 3). As illustrated, the openings 12 are formed in opposed sides of the fuselage in alignment with one another and serve to accommodate the inner ends of the wings 13 which are connected to a transversely extending wing spar 14. Riveted as at 15 or otherwise attached to the wing spar 14 adjacent each end is an attaching plate 16 of a cylinder 17. Each cylinder 17 extends through the wing spar adjacent its junction with a wing 13 and opposite ends of the cylinders are closed by end caps 18 having aligned openings 19 for a purpose to be more fully hereinafter explained. As illustrated in Figure 3, the axes of the cylinders 17 lie parallel to one another and also parallel to the vertical axis of the fuselage 10 so that while the wing spar 14 and wings 13 may move vertically with relation to the fuselage, they will be held against movement in any other direction. Each cylinder 17 is provided adjacent each end with a laterally extending nipple 20, which nipples are provided with axial bores communicating with the interiors of their respective cylinders and each nipple is externally screw-threaded to receive a coupling nut 21 by means of which a bypass pipe 22 is coupled to each respective cylinder. A suitable control valve 23 is interposed between the opposite ends of each bypass pipe 22 for a purpose to be hereinafter described.

Attached to the inner wall of the fuselage above the upper end of each cylinder 17 is a suitable bracket 24, and a somewhat similar bracket 25 is attached to each side wall of the fuselage directly below each cylinder 17. A plunger rod 26 is coupled as at 27 to each bracket 24 and extends downwardly through its respective cylinder 17 and the aligned openings 19 in the caps 18 thereof, and is anchored at its lower end as at 28 to the bracket 25 directly below the bracket 24 to which the upper end of the rod is attached. These rods are arranged with their longitudinal axes in spaced parallel relation and like the cylinders are also parallel with the vertical axis of the fuselage. Secured to each rod 26 substantially midway between its upper and lower ends is a plunger or piston 29 carrying conventional oil seal rings 30 which contact the inner walls of its respective cylinder 17 to form a fluid seal therewith which will prevent fluid contained within the cylinder from passing between the plunger and the cylinder wall. A compression coil spring 31 surrounds each rod 26 between the upper end of the plunger 29 and the underside of the upper cap 18 and a similar coil spring 32 surrounds the plunger rod between the lower end of the plunger 29 and the lowermost cap 18 so that the plunger will be yieldingly held substantially midway between opposite ends of its respective cylinder 17. It will thus be seen that the wing spar 14 will be yieldingly held with relation to the fuselage 11, so that when the plane is in flight the weight of the fuselage will be supported on the springs 31, and when the plane contacts the ground the wings will be supported on the springs 32. It will thus be seen that the wings are supported to float to a restricted degree with relation to the fuselage, and hence, when rough air is encountered the wings may vibrate without transmitting shock to the fuselage and the occupants thereof.

In order to seal the openings 12 each wing is surrounded at the point where it enters its respective opening 12 with a suitable shield 34 which may move over the outside face of the fuselage, as the wing moves thereon.

In taking off, the wings 13 which are normally supported on the springs 31, will exert pressure against the springs 32 to cause them yieldingly to exert lifting force on the undersides of the plungers 29. The lifting force will thus be transmitted through the rod 26 and the brackets 24 and 25 to the fuselage. With the cylinders 17 filled with a suitable non-compressible fluid such as oil it is obvious that by regulating the valves 23 the reaction of the springs 31 and 32 may be governed and that the device will act not only as a spring suspension for the wings and fuselage, but also as a snubber to prevent too violent reaction of the springs. Obviously, when in flight and rough air is encountered the wings may vibrate against the springs without transmitting the vibrations to the fuselage.

While in the foregoing there has been shown and described the preferred embodiment of this invention it is to be understood that minor changes in the details of construction, combination and arrangement of parts may be resorted to without departing from the spirit and scope of the invention as claimed.

I claim:

1. Winged aircraft which includes a fuselage, a wing spar mounted in the fuselage for movement parallel with the vertical axis of the fuselage, a wing carried by each end of the wing spar and extending laterally from the fuselage, a cylinder fixed adjacent each end of the wing spar, a plunger rod movable through each cylinder, each plunger rod being fixed at opposite ends to the adjacent side of the fuselage, and means surrounding each plunger rod yieldingly to support the wing spar substantially midway between opposite ends of the plunger rods.

2. Winged aircraft which includes a fuselage, a wing spar mounted in the fuselage for movement parallel with the vertical axis of the fuselage, a wing carried by each end of the wing spar and extending laterally from the fuselage, a cylinder fixed adjacent each end of the wing spar, a plunger rod movable through each cylinder, each plunger rod being fixed at opposite ends to the adjacent side of the fuselage, a plunger on each rod midway between its ends, a cap on each end of each cylinder and compression springs within the cylinders surrounding each plunger rod above and bearing on the plungers yieldingly to retain the plungers midway between opposite ends of their respective cylinders.

3. Winged aircraft which includes a fuselage, a wing spar mounted in the fuselage for movement parallel with the vertical axis of the fuselage, a wing carried by each end of the wing spar and extending laterally from the fuselage, a cylinder fixed adjacent each end of the wing spar, a plunger rod movable through each cylinder, each plunger rod being fixed at opposite ends to the adjacent side of the fuselage, and means surrounding each plunger rod yieldingly to support the wing spar substantially midway between opposite ends of the plunger rods, and means to retard the action of the yielding means.

4. Winged aircraft which includes a fuselage, a wing spar mounted in the fuselage for movement parallel with the vertical axis of the fuselage, a wing carried by each end of the wing spar and extending laterally from the fuselage, a cylinder fixed adjacent each end of the wing spar, a plunger rod movable through each cylinder, each plunger rod being fixed at opposite ends to the adjacent side of the fuselage, a plunger on each rod midway between its ends, a cap on each end of each cylinder and compression springs within the cylinders surrounding each plunger rod above and bearing on the plungers yieldingly to retain the plungers midway between opposite ends of their respective cylinders, and fluid within the cylinders to retard the action of the springs.

ALFRED H. LEONARD.
JOSEPH H. BLANDFORD.

REFERENCES CITED

The following references are of record in the file of this patent:

UNITED STATES PATENTS

| Number | Name | Date |
| --- | --- | --- |
| 1,725,222 | Stelzer | Aug. 20, 1929 |
| 1,885,571 | Wilson | Nov. 1, 1932 |
| 2,186,558 | Rouanet | Jan. 9, 1940 |

FOREIGN PATENTS

| Number | Country | Date |
| --- | --- | --- |
| 447 | Great Britain | 1915 |
| 161,711 | Great Britain | Apr. 20, 1921 |
| 680,846 | France | Jan. 23, 1930 |